United States Patent
Rose, Jr. et al.

(10) Patent No.: US 9,816,488 B2
(45) Date of Patent: Nov. 14, 2017

(54) ROTOR TURNING SYSTEM AND METHOD

(71) Applicant: General Electric Company, Schenectady, NY (US)

(72) Inventors: Raymond Francis Rose, Jr., Niskayuna, NY (US); Jeffrey Eric Bergman, Mechanicville, NY (US); Brent Hamilton Holloway, Greenville, SC (US); Drake Joseph Viscome, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1048 days.

(21) Appl. No.: 14/068,600

(22) Filed: Oct. 31, 2013

(65) Prior Publication Data

US 2015/0118056 A1    Apr. 30, 2015

(51) Int. Cl.
| | |
|---|---|
| *F03D 15/00* | (2016.01) |
| *F03D 80/55* | (2016.01) |
| *F03D 80/00* | (2016.01) |
| *F03D 80/50* | (2016.01) |

(52) U.S. Cl.
CPC ............ *F03D 15/00* (2016.05); *F03D 80/00* (2016.05); *F03D 80/50* (2016.05); *F03D 80/55* (2016.05); *Y02E 10/72* (2013.01); *Y10T 29/49316* (2015.01)

(58) Field of Classification Search
CPC .......... F03D 13/30; F03D 15/00; F03D 80/00; F03D 80/50; F03D 80/55; Y02E 10/72; Y10T 29/49316
See application file for complete search history.

(56) References Cited

U.S. PATENT DOCUMENTS

| | | | | |
|---|---|---|---|---|
| 2,573,939 | A * | 11/1951 | Verville | F16B 1/04 188/82.2 |
| 4,083,259 | A * | 4/1978 | Seliger | F01D 25/34 235/95 R |
| 4,794,825 | A * | 1/1989 | Schmoyer | B25B 23/0078 81/57.24 |
| 7,958,797 | B2 * | 6/2011 | Aust | F03D 80/50 269/32 |
| 8,210,810 | B2 * | 7/2012 | Egoshi | F03D 1/06 416/1 |
| 8,450,871 | B2 * | 5/2013 | Trede | F01D 25/36 290/4 R |
| 8,702,389 | B2 * | 4/2014 | Wedekind | F03D 7/0224 416/153 |
| 8,757,973 | B2 * | 6/2014 | Husken | F03D 7/0268 415/122.1 |

(Continued)

FOREIGN PATENT DOCUMENTS

| | | | |
|---|---|---|---|
| DE | 19949485 A1 | 4/2001 | |
| EP | 1167755 A2 * | 1/2002 | ........... F03D 7/0244 |

*Primary Examiner* — Dwayne J White
*Assistant Examiner* — Adam W Brown
(74) *Attorney, Agent, or Firm* — Douglas D. Zhang; GE Global Patent Operation

(57) ABSTRACT

A rotor turning system includes a fixture plate configured for attachment to a gearbox, a locking mechanism configured for attachment to the fixture plate, and a reaction fixture configured for attachment to the locking mechanism. The rotor turning system is configured to permit rotation of the rotor only when rotational torque is applied to the locking mechanism, and this rotation is in only one rotational direction.

19 Claims, 16 Drawing Sheets

(56) References Cited

U.S. PATENT DOCUMENTS

| | | | | |
|---|---|---|---|---|
| 9,035,476 B2* | 5/2015 | Fujiwara | ............... | F16D 7/10 |
| | | | | 290/1 C |
| 2008/0181761 A1* | 7/2008 | Moore | ............... | F03D 7/0248 |
| | | | | 415/1 |
| 2009/0278359 A1* | 11/2009 | Trede | ............... | F01D 25/36 |
| | | | | 290/55 |

* cited by examiner

ROTOR TURNING SYSTEM AND METHOD

BACKGROUND OF THE INVENTION

The invention described herein relates generally to wind turbines. More specifically, the invention relates to a rotor turning system and method that allows the rotor to turn in a desired rotational direction, but prevents the rotor from turning in an undesired rotational direction.

The process to replace or remove a blade from a wind turbine typically requires an expensive crane and a number of personnel. The crane is used to support the blade, and this same crane at a different time may be used to carry a basket for a worker (often termed a man basket). The worker climbs into the basket and is then raised up to the tip of the blade. A sling (or sock) is physically placed over the blade tip and then slid along the blade. As one may imagine, this is a difficult process in windy conditions. Cranes are very expensive to rent and operate, and the basket can only be used in periods of low wind, due to worker safety concerns. These limitations make blade removal difficult and expensive.

Most wind turbine rotors have three blades, and the rotor is balanced when all three blades are attached. It is relatively easy to rotate a balanced rotor, as the force of gravity (or wind) is usually minimal and manageable, and the rotor can be maintained in a desired position or moved in a desired rotational direction. However, when one or two blades are missing the rotor becomes unbalanced. In unbalanced rotor situations, a danger exists of unwanted rotor movement. Unfortunately, the standard brake caliper is often not designed to hold an unbalanced rotor, nor is it designed to prevent unwanted reverse rotation during unbalanced rotor rotation. An unbalanced rotor often has the force of gravity acting against the intentions of a technician who is trying to move the rotor in a desired rotational direction. If an unbalanced rotor suddenly and unexpectedly reverses direction, a technician inside the nacelle could be exposed to hazardous conditions from moving machine parts.

BRIEF DESCRIPTION OF THE INVENTION

In an aspect of the present invention, a rotor turning system includes a fixture plate configured for attachment to a gearbox, a locking mechanism configured for attachment to the fixture plate, and a reaction fixture configured for attachment to the locking mechanism. The rotor turning system is configured to permit rotation of the rotor only when rotational torque is applied to the locking mechanism, and this rotation is in only one rotational direction.

In another aspect of the present invention, a rotor turning system includes a fixture plate configured for attachment to a gearbox. The fixture plate is also configured for attachment to a lockout assembly. A locking mechanism is configured for attachment to the fixture plate. The locking mechanism is also configured for operation with a torque applying device. The torque applying device is configured for applying rotational torque to the locking mechanism. A reaction fixture is configured for attachment to the locking mechanism, and the reaction fixture is configured as a support against rotational movement for the torque applying device. The locking mechanism is configured to permit rotation of the rotor in a desired rotational direction when rotational torque is applied to the locking mechanism by the torque applying device. The locking mechanism is configured to prevent rotation of the rotor in an undesired rotational direction when rotational torque is not applied to the locking mechanism by the torque applying device.

In yet another aspect of the present invention, a method for turning a rotor in a desired rotational direction includes the steps of, connecting a locking mechanism to a gearbox and applying rotational torque to the locking mechanism to turn the rotor in the desired rotational direction. The locking mechanism is configured to permit the rotor to turn in the desired rotational direction and prevent movement of the rotor in an undesired rotational direction. When the rotational torque is removed the locking mechanism is configured to prevent movement of the rotor in the undesired rotational direction. The desired rotational direction is opposite to the undesired rotational direction (e.g., clockwise vs. counter-clockwise, or vice-versa). The connecting step may also include engaging teeth of a drive pinion in the locking mechanism with teeth of a brake disk connected to the gearbox. The locking mechanism includes a drive paw having curved surfaces configured to contact a plurality of bearings. The locking mechanism is configured to permit the rotor to turn in the desired rotational direction by the curved surfaces pushing a portion of the plurality of bearings down ramped surfaces of a hub when rotational torque is applied by a torque applying device. The locking mechanism prevents movement of the rotor in the undesired rotational direction by a second portion of the plurality of bearings being forced up the ramped surfaces and lodging between the basket and the ramped surfaces when no rotational torque is applied by the torque applying device.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
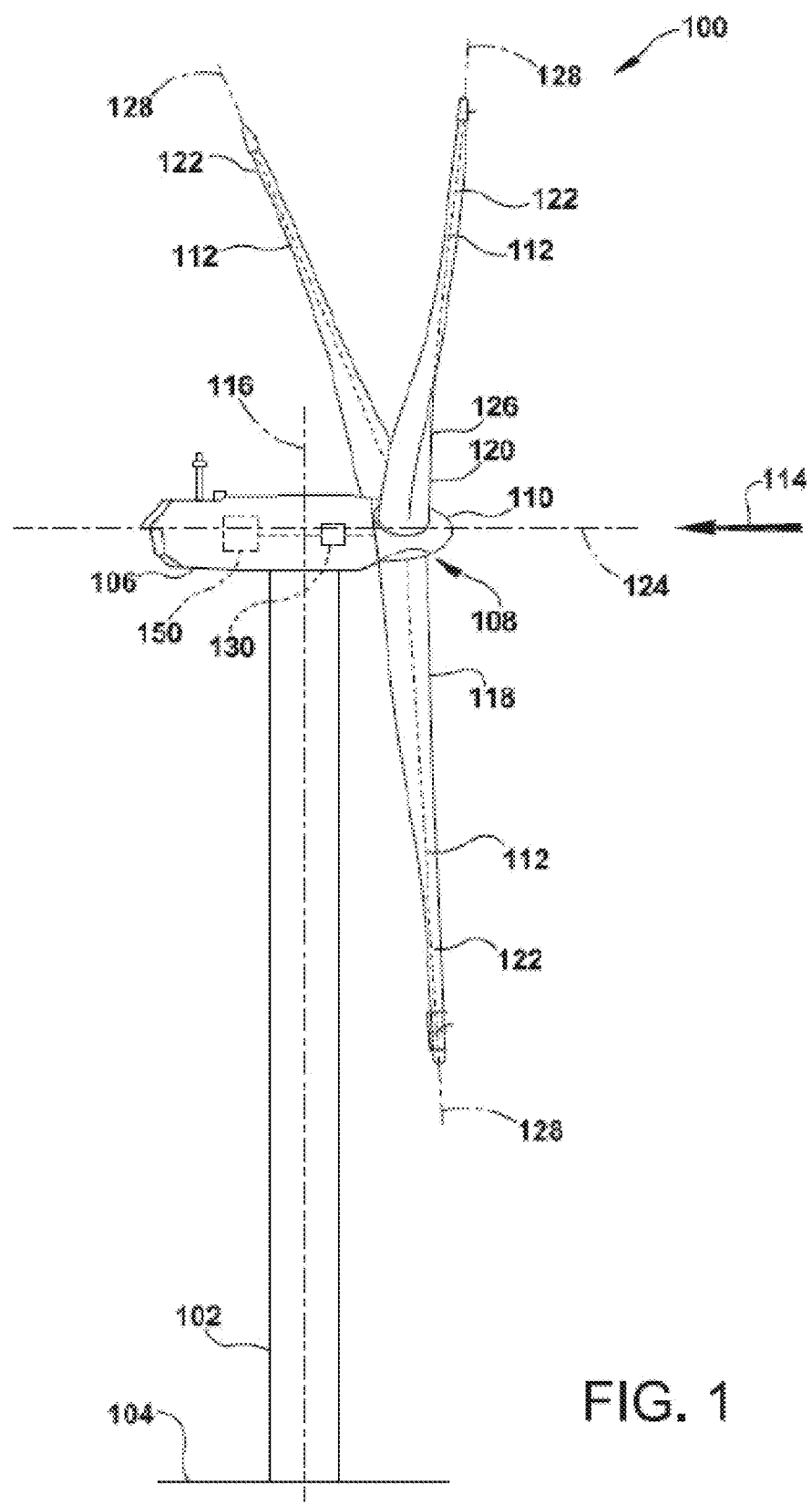
FIG. 1 illustrates a perspective view of an exemplary wind turbine.

FIG. 1 is a schematic view of an exemplary wind turbine 100. In the exemplary embodiment, wind turbine 100 is a horizontal-axis wind turbine. Wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a main shaft assembly 108 is coupled to nacelle 106. Main shaft assembly (or rotor) 108 includes a rotatable hub 110 and a plurality of rotor blades 112 coupled to hub 110. Main shaft assembly 108 includes three rotor blades 112. Alternatively, main shaft assembly 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating main shaft assembly 108, thereby transferring kinetic energy from wind 114 into usable mechanical energy, and subsequently, electrical energy. Main shaft assembly 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

Rotor blades 112 may have a length of between approximately 30 meters (m) (99feet (ft)) and approximately 120 m (394 ft), and each rotor blade may weigh about 10 to 20 tons or more. Alternatively, rotor blades 112 may have any suitable length or weight that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112, and the pitch angles of rotor blades 112 may be controlled individually. Further, wind turbine 100 includes a main gearbox 130 and a generator 150 within nacelle 106. Main shaft assembly 108 includes a low-speed shaft (not shown in FIG. 1) that extends into main gearbox 130 and a high-speed shaft (not shown in FIG. 1) extends to generator 150.

Figure 2:
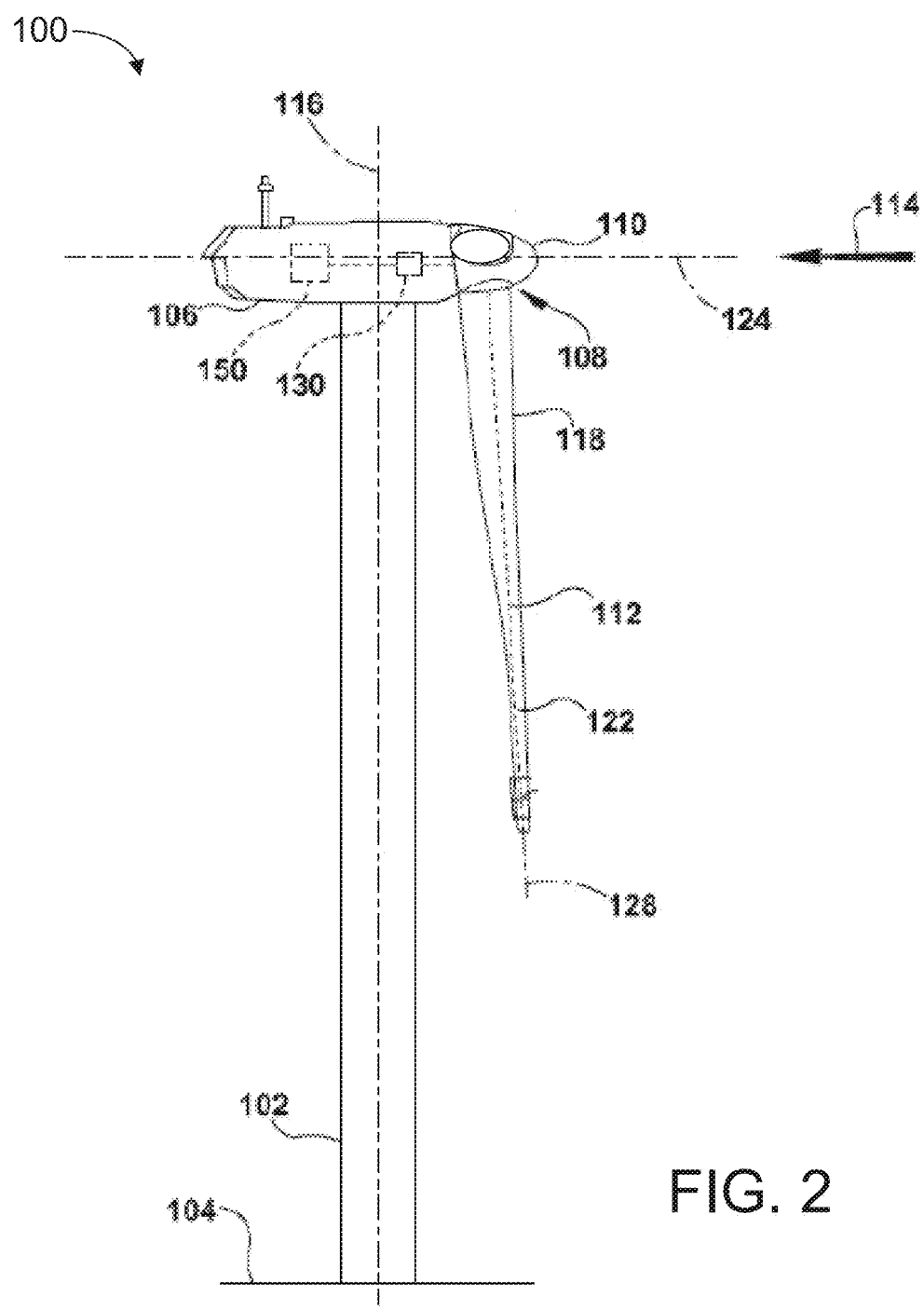
FIG. 2 illustrates a perspective view of the wind turbine of FIG. 1 having only one blade attached to the rotor.

FIG. 2 illustrates a perspective view of the wind turbine 100 having only one blade 112 attached to hub 110. In some instances, the hub 110 may be either attached to the nacelle (i.e., the main shaft) first, followed by subsequent attachment of the individual rotor blades 112, or the rotor blades may be removed from the hub one at a time. Both approaches result in an unbalanced rotor. When one or two rotor blades are missing from the rotor, it is very challenging to turn the rotor, as gravity acts to keep the blade 112 pointing downward. In contrast, with a balanced rotor it is relatively easy to turn the rotor from within the nacelle, as all three rotor blades are attached and provide balance.

Typically, a worker inside the nacelle will turn a brake disk attached to the gearbox, and this rotation translates into rotor rotation. The brake disk is connected to the high speed shaft of the gearbox so it takes many revolutions of the brake disk to result in one turn of the rotor. In unbalanced rotor situations, a danger exists of unwanted rotor movement during unbalanced rotor movement. The standard brake caliper is not designed to hold an unbalanced rotor, nor is it designed to prevent unwanted reverse rotation during unbalanced rotor rotation.

Figure 3:
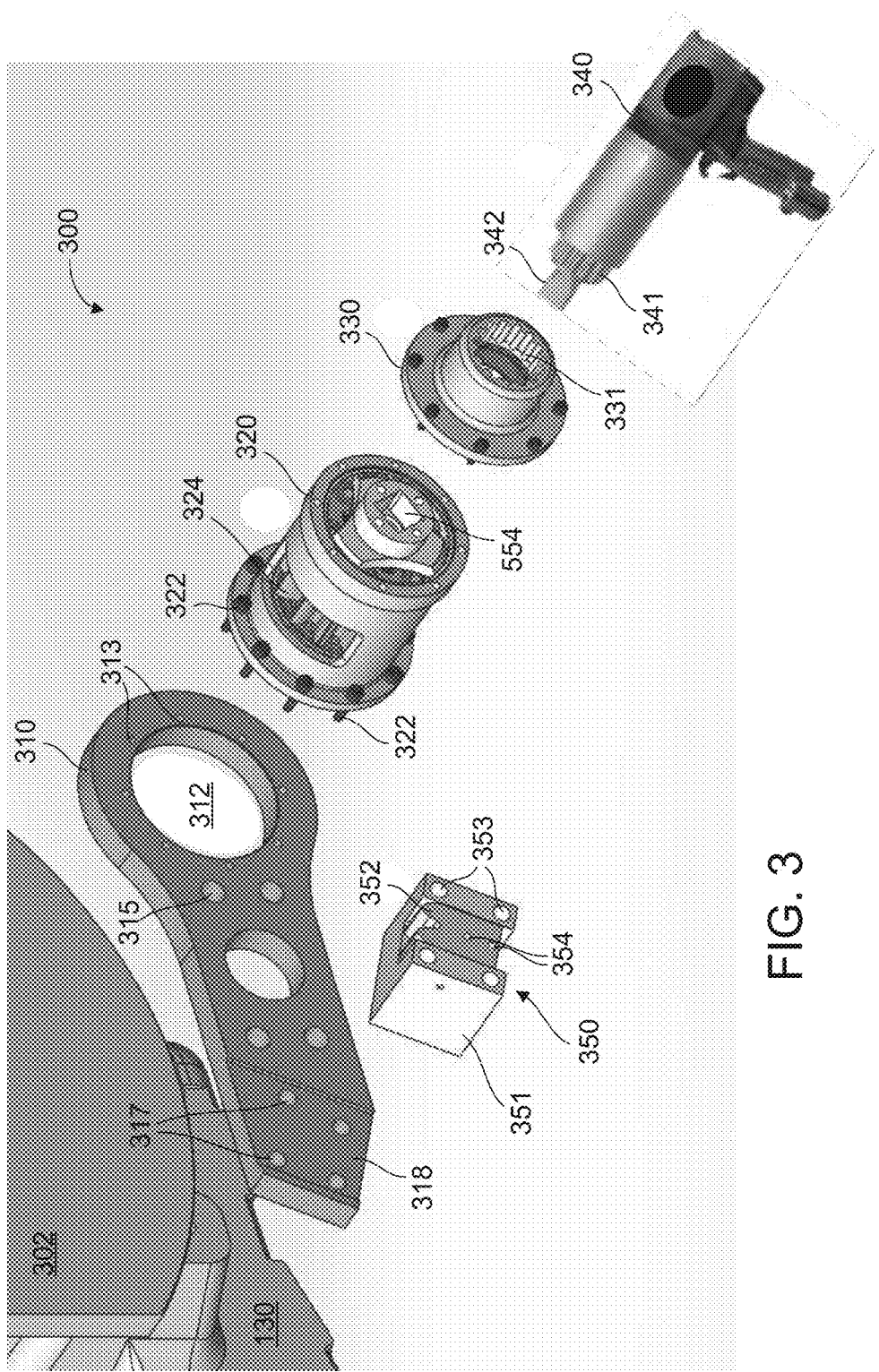
FIG. 3 illustrates an exploded view of a rotor turning system, according to an aspect of the present invention.

FIG. 3 illustrates an exploded view of a rotor turning system 300, according to an aspect of the present invention. The rotor turning system 300 includes a fixture plate 310 configured for attachment to a gearbox 130, a locking mechanism 320 configured for attachment to the fixture plate 310, a reaction fixture 330 configured for attachment to the locking mechanism 320 and a torque applying device 340 configured for operation with the locking mechanism 320 and the reaction fixture 330. A lockout assembly 350 is configured for attachment to the fixture plate 310. The lockout assembly 350 is also configured to engage a toothed peripheral surface of brake disk 302. The rotor turning system 300 is configured to permit rotation of the rotor 108 only when the torque applying device 340 is activated, and in only one rotational direction. In other words, torque produced by gravity and/or wind acting on the one or more blades 112 will not cause the rotor 108 to turn.

Figure 4:
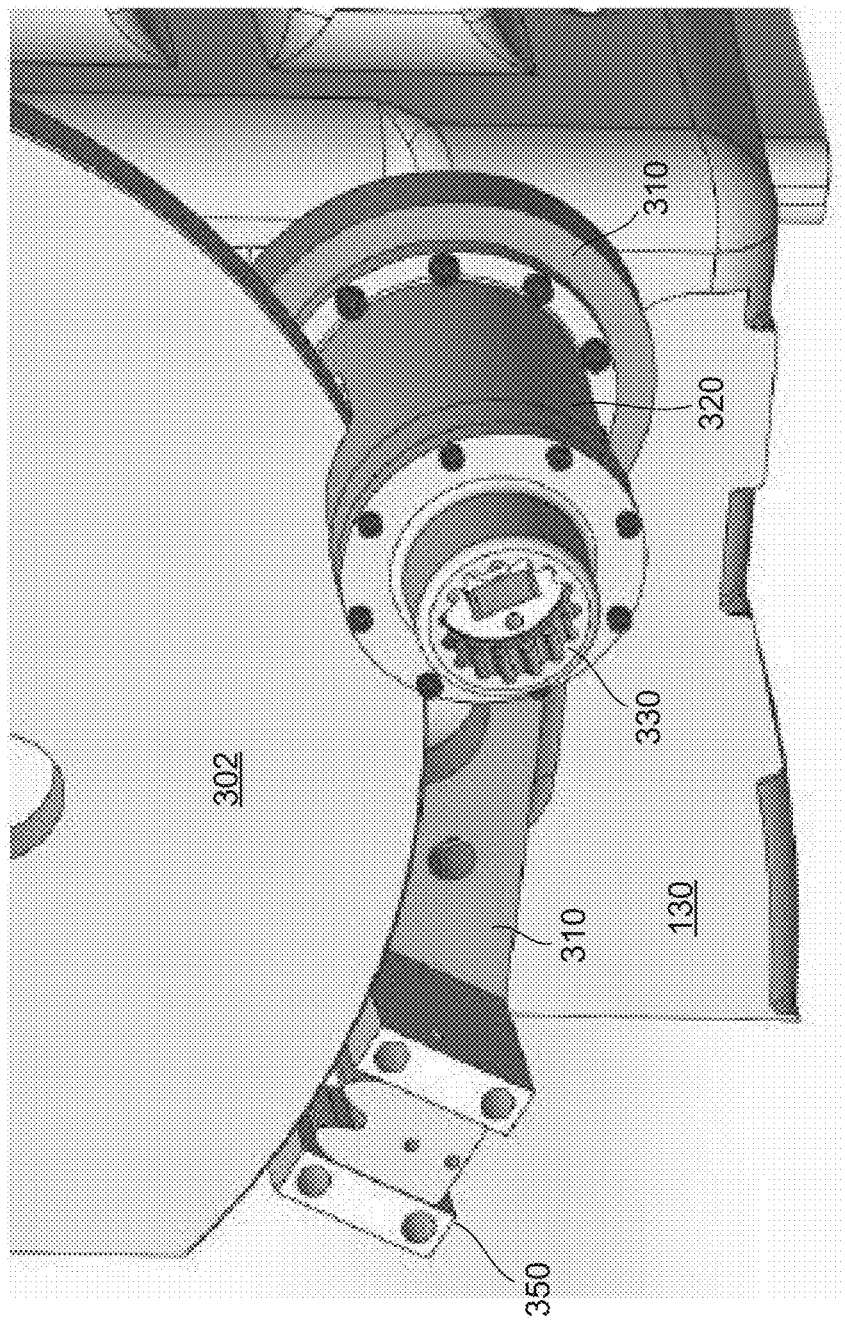
FIG. 4 illustrates a perspective view of the rotor turning system, according to an aspect of the present invention.

FIG. 4 illustrates a perspective view of the rotor turning system 300 attached to the gearbox 130, according to an aspect of the present invention. The torque applying device 340 is omitted for clarity in FIG. 4. The fixture plate 310 is shown attached (e.g., bolted) to the gearbox 130. The locking mechanism 320 is bolted to the fixture plate by a plurality of bolts 322. The reaction fixture is bolted to the locking mechanism by a plurality of bolts 332. The teeth on the periphery (i.e., outer circumference) of the brake disk 302 engage teeth 324 on the drive pinion of the locking mechanism. As the torque applying device rotates, the drive pinion rotates and forces the brake disk to rotate in the same direction (e.g., clockwise or counter-clockwise). The lockout assembly is used when the rotor is to be locked in a desired position, as the lockout assembly prevents and rotation of brake disk 302 and subsequently rotor 108.

The fixture plate 310 may be attached to the gearbox 130 with a plurality of fasteners (not shown in FIG. 3), or the fixture plate 310 could be integrally formed with the gearbox 130 or welded to the gearbox 130. The fixture plate 310 includes a substantially circular opening 312, and a plurality of holes 313 (which may be internally threaded) are circumferentially disposed around the opening 312. The locking mechanism 320 attaches to the fixture plate 310 around the substantially circular opening 312. A second plurality of holes 315 are provided for attaching the fixture plate to the gearbox 130. A third plurality of holes 317 are provided for mounting of the lockout assembly 350. The fixture plate 310 also includes a recess 318 within which the lockout assembly 350 is retained. The recess 318 provides additional circumferential support to the lockout assembly 350. The holes in the fixture plate may be threaded (e.g., for use with screws or bolts) or non-threaded (e.g., for use with nuts and bolts). The fixture plate may be fabricated of high strength material, such as steel, titanium, aluminum, or alloys thereof, and its weight is preferably less than about 45 pounds. The weight limit of about 45 pounds is designed to facilitate up-tower transport of the fixture plate. Weights substantially above this range can make it difficult for a worker to carry the fixture plate up or down the tower 102.

Figure 5:
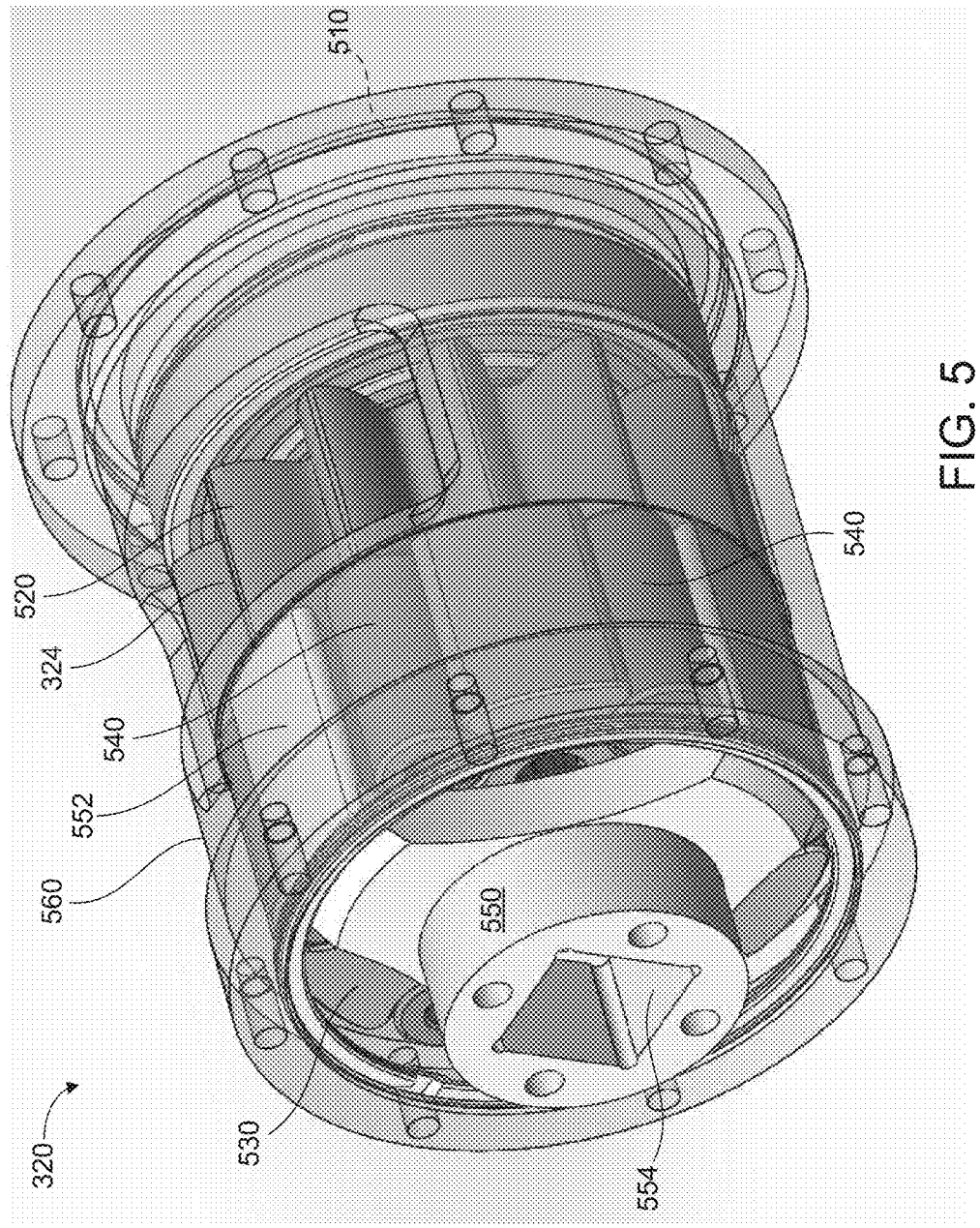
FIG. 5 illustrates a perspective view of the locking mechanism, according to an aspect of the present invention.

FIG. 5 illustrates a perspective view of the locking mechanism 320, according to an aspect of the present invention. The locking mechanism includes a substantially circular shoulder 510 located at one end of the device. The shoulder 510 is configured to fit into the substantially circular opening 312 of the fixture plate 310. The substantially circular opening 312 and the substantially circular shoulder 510 function to support a portion of the weight of the locking mechanism 320 in order to facilitate attachment of the locking mechanism 320 to the fixture plate 310 by a worker. The locking mechanism may weigh about 45 pounds, so it could be difficult for one person to hold the locking mechanism 320 and tighten the bolts 322 at the same time. The shoulder 510 and opening 312 eliminate this problem, as the locking mechanism will temporarily support itself in the opening 312.

The locking mechanism 320 includes a pinion gear 520 having a plurality of teeth 324. The pinion gear 520 is configured for interaction with the brake disk 302. As described previously, the brake disk 302 is mechanically coupled with the rotor 108. A hub 530 is rigidly connected to the pinion gear 520. For example, the hub 530 may be bolted to the pinion gear 520, or the hub 530 and pinion gear 520 may be formed as one integral member. A plurality of bearings 540 are dispersed about the hub 530. The bearings 540 may be roller bearings or any suitable type of bearing as desired in the specific application. A drive paw 550 has a plurality of fingers 552, and each finger 552 extends over the hub 530 and each finger 552 is located between two of the bearings 540. The drive paw 550 is configured for interaction with the torque applying device 340. For example, the torque applying device 340 may have a square (or rectangular) drive end, and the substantially square receptacle 554 is configured so that the drive end of the torque applying device can be inserted into the square receptacle 554. The drive paw 550 may also be viewed as having a substantially rectangular opening 554 configured for insertion of a rotating portion of the torque applying device 340. A basket 560 (shown as transparent for clarity) is circumferentially disposed over the hub 530 and the drive paw 550. The locking mechanism 320 is configured to prevent rotation of the brake disk 302 without torque supplied by the torque applying device 340 to the drive paw 550.

Figure 6:
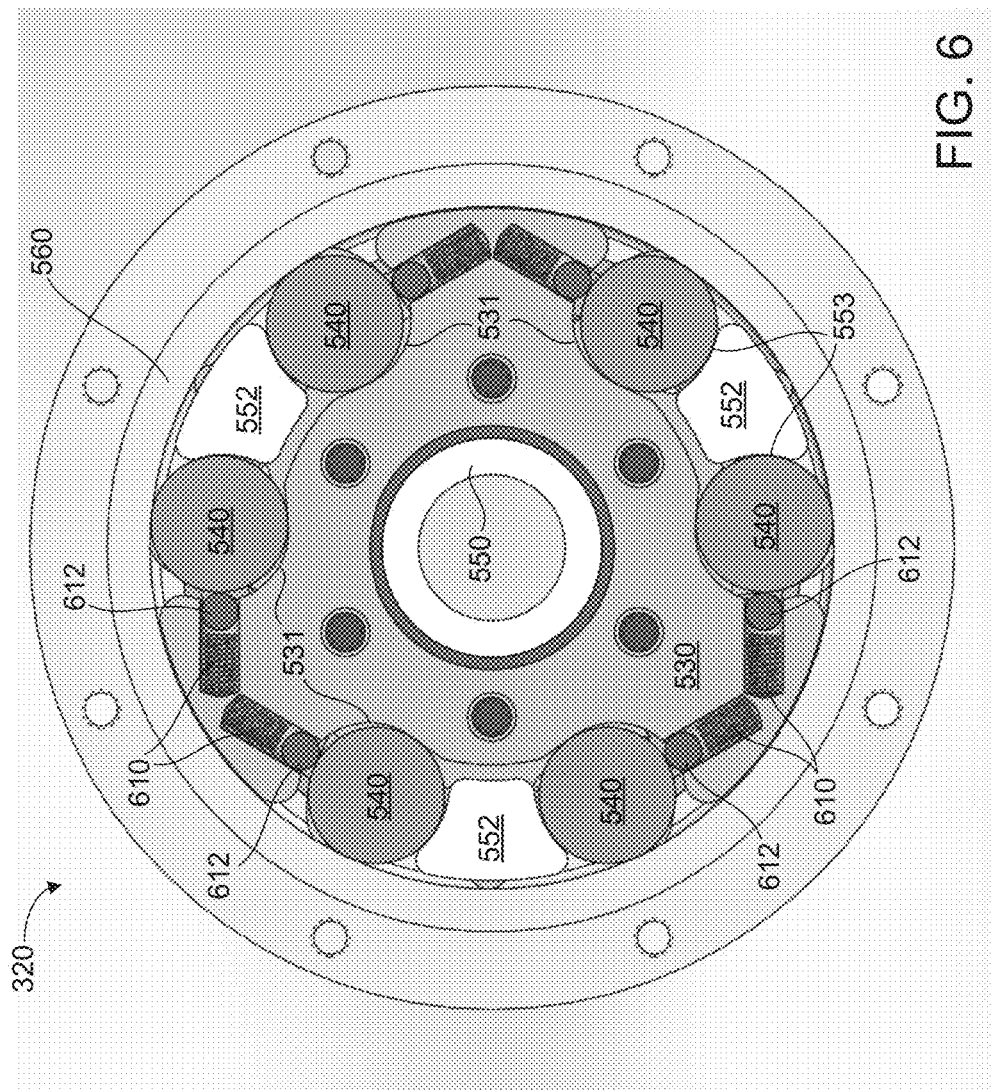
FIG. 6 illustrates a cross-sectional view of the locking mechanism in a locked condition, according to an aspect of the present invention.
Figure 7:
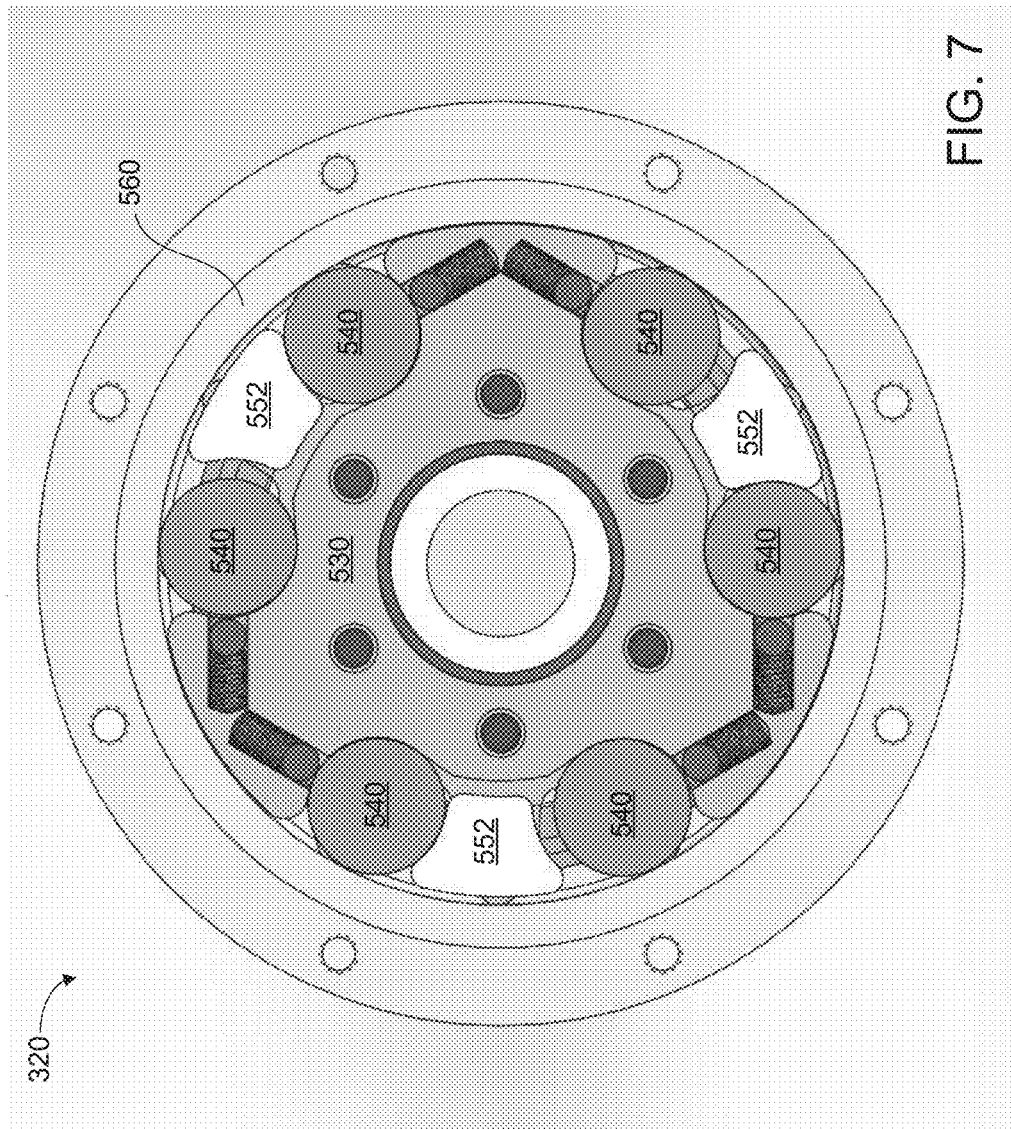
FIG. 7 illustrates a cross-sectional view of the locking mechanism in an unlocked condition, according to an aspect of the present invention.

FIG. 6 illustrates a cross-sectional view of the locking mechanism 320, according to an aspect of the present invention. FIG. 6 illustrates the locking mechanism in its locked position, thereby preventing unwanted rotation of hub 530. FIG. 7 illustrates a cross-sectional view of the locking mechanism 320 in an unlocked condition, thereby permitting rotation of the hub 530 in the clockwise direction. A plurality of spring members 610 and bearings 612 are located in the hub. Each of the spring members 610 and bearings 612 bias one of the bearings 540 toward a finger 552 of the drive paw 550. The drive paw 550 also includes curved surfaces 553 on each finger 552, and these curved surfaces 553 are configured to contact bearings 540. Torque applied from the drive paw finger 552 easily overcomes the spring 610 pressure. For example, when torque is applied (by the torque applying device 340 and drive paw 550) in the clockwise direction, the curved surfaces 552 on the clockwise side of finger 552 push the bearings (on the clockwise side of the finger 552) down a ramped surface 531 of the hub 530, thereby resulting in clockwise rotation of the hub 530 and pinion gear 520.

The ramped surfaces 531 of hub 530 are configured to contact the plurality of bearings 540, and permit the drive paw finger 552 to push a first portion of the plurality of bearings (e.g., those on the clockwise side) away from the basket 560, and a second portion of the plurality of bearings (e.g., those on the counter-clockwise side) are allowed to rotate between the basket 560 and the hub 530. The system is configured to stop rotation of the hub 530, the pinion gear 520 and the rotor when no torque is applied by the torque applying device. This occurs when the second portion of the plurality of bearings (e.g., those on the counter-clockwise side) are forced up the ramped surfaces 531 and become lodged between the basket 560 and the ramped surfaces 531. Conversely, when torque is applied by drive paw 550 (and the torque applying device 340) in the counter-clockwise direction, the curved surfaces 552 on the counter-clockwise side of finger 552 push the bearings (on the counter-clockwise side of the finger 552) down the ramped surface 531 of the hub 320, thereby resulting in counter-clockwise rotation of the hub 530 and pinion gear 520. When counter-clockwise torque is removed, the locking mechanism prevents substantial clockwise movement as the bearings 540 on the clockwise side will move along ramped surfaces 531 until they lodge between the basket 560 and the ramped surfaces 531.

Figure 8:
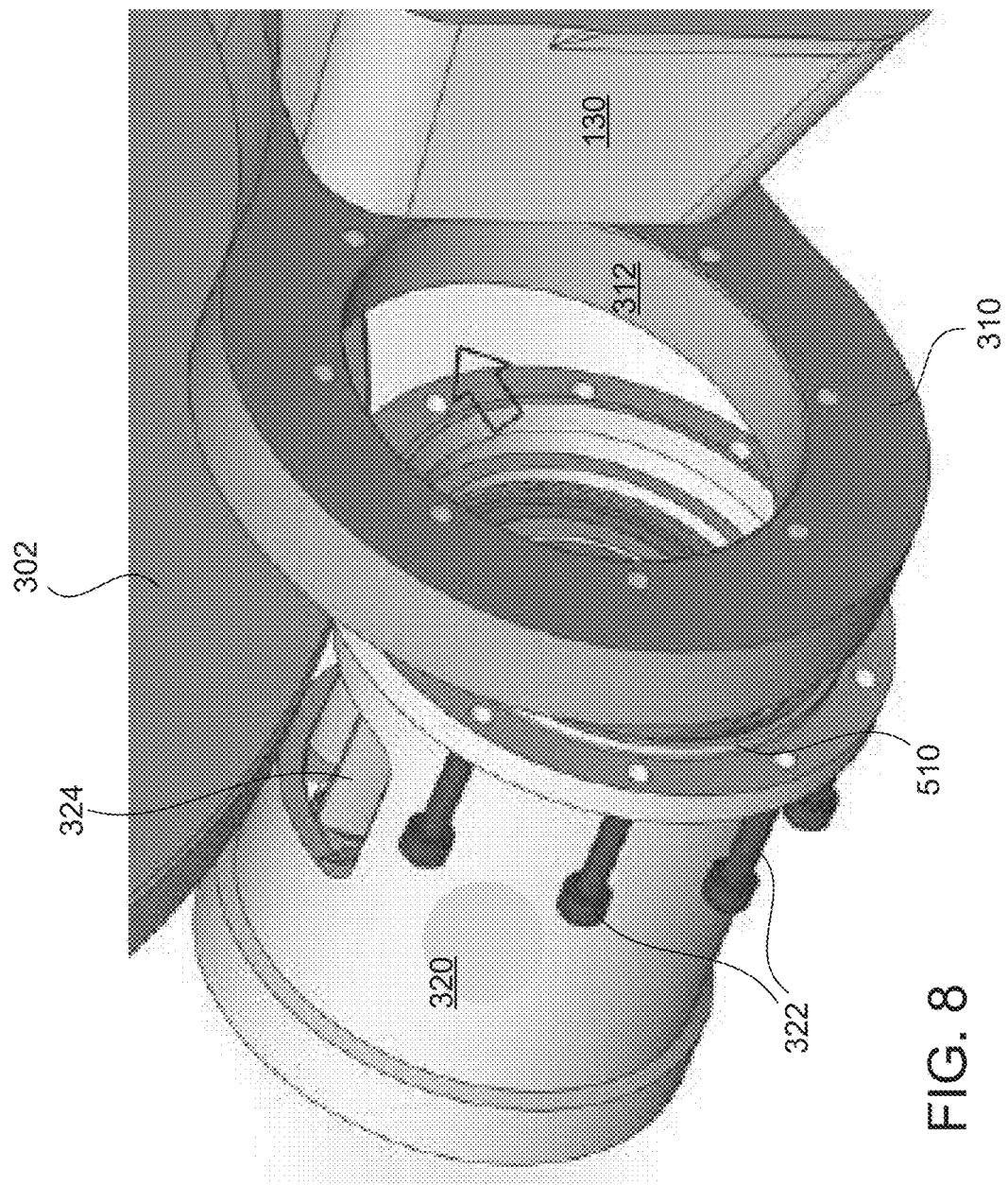
FIG. 8 illustrates a perspective view of the locking mechanism being installed on the fixture plate, according to an aspect of the present invention.
Figure 9:
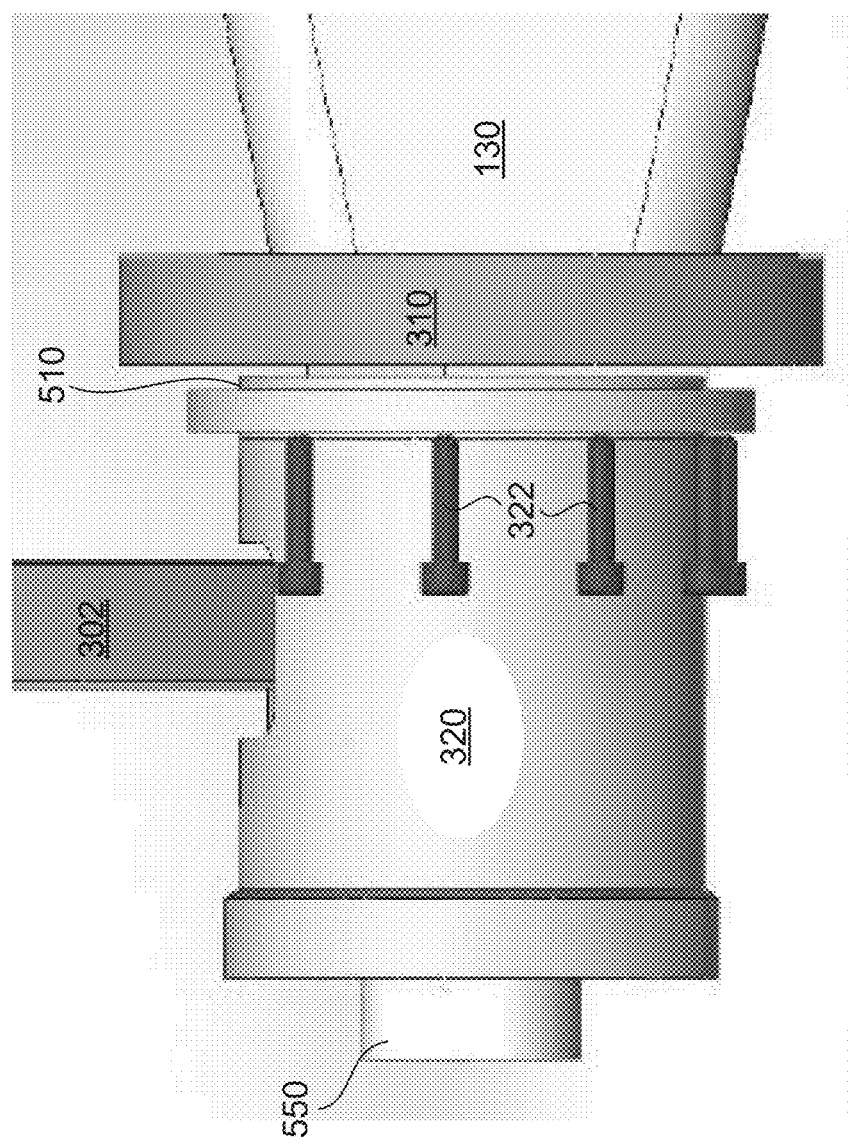
FIG. 9 illustrates a side view of the locking mechanism being installed on the fixture plate, according to an aspect of the present invention.

FIG. 8 illustrates a perspective view of the locking mechanism 320 being installed on the fixture plate 310, according to an aspect of the present invention. FIG. 9 illustrates a side view of the locking mechanism 320 being installed on the fixture plate 310, according to an aspect of the present invention. The fixture plate 310 would preferably be installed on the gearbox 130 first. The locking mechanism 320 can then be attached to the fixture plate 310 by radially sliding the teeth 324 into alignment with the brake disk 302, and then axially sliding the shoulder 510 into the opening 312. A majority of the weight of the locking mechanism 320 is supported by the fixture plate 310, once the shoulder 510 is slid into and engages the opening 312. At this point a technician can line up and install the fasteners 322.

The reaction fixture 330 includes a toothed inner surface 331 configured to interact with a toothed outer surface 341 of the torque applying device 340. Both the toothed inner surface and the toothed outer surface are configured (by interacting with each other) to prevent an outer body of the torque applying device 340 from rotating during activation of the torque applying device 340. For example, during use, the drive end 342 of the torque applying device will be inserted into reaction fixture 330 and then into opening 554 of the drive paw 550. As this occurs, the toothed outer surface 341 will also be inserted into the reaction fixture 330 and the two toothed surfaces 331 and 341 will mate. The teeth on both surfaces prevent the body of the torque applying device 340 from rotating during use. Using an impact wrench as an example, the toothed inner surface 331 may be viewed as the reaction arm and the toothed outer surface 341 may be viewed as a spline or serpentine (the drive end 342 would be viewed as the output square drive). The reaction fixture 330 may be fabricated of high strength material, such as steel, titanium, aluminum, or alloys thereof, and its weight is preferably less than about 8 pounds. The weight limit of about 8 pounds is designed to facilitate up-tower transport of the reaction fixture 330.

The torque applying device 340 may be an impact wrench. As one example only, the torque applying device 340 is a model 60DX pneumatic series impact wrench from RAD Torque Systems® (a registered mark of New World Technologies). This impact wrench is rated for a torque range of about 2000 to 6,000 ft/lbs, and has a weight of about 28 pounds. The torque applying device 340 (or impact wrench) could be pneumatically, electrically, battery or hydraulically powered. For typical utility scale wind turbine applications, the torque applying device 340 may be configured to apply torque in a range of about 2,000 ft/lbs to about 6,000 ft/lbs, and weigh less than about 30 pounds. However, torque ranges and weights above or below the stated ranges may be employed as desired in the specific application. The weight limit of about 30 pounds is designed to facilitate up-tower transport of the torque applying device 340 (e.g., impact wrench).

The lockout assembly 350 includes a bracket 351 configured to mount to and within the recess 318 of the fixture plate 310. For example, bolts can be inserted into holes 353 and holes 317 to attach the bracket 351 to the fixture plate 310. A toothed member 352 is configured to move radially and lock in a desired radial position. For example, fasteners can be screwed into holes 354 until they bottom out on bracket 351 to lock the toothed member 352 in a desired radial position. The toothed member 352 is configured to engage a toothed surface of the brake disk, and when the toothed member 352 is locked in an engaged brake disk position, the toothed member 352 prevents rotation of the brake disk and the rotor. Conversely, when the toothed member is retracted radially, so that it does not engage the teeth on the brake disk 302, then the brake disk is free to rotate (pending interaction with locking mechanism 320).

The lockout assembly 350 may be fabricated of high strength material, such as steel, titanium, aluminum, or alloys thereof, and its weight is preferably about 15 pounds. The weight limit of about 15 pounds is designed to facilitate up-tower transport of the lockout assembly 350. As described previously, each of the fixture plate 310, the locking mechanism 320, lockout assembly 350, the torque applying device 340 and the reaction fixture 330 individually weigh less than about 45 pounds, to facilitate up-tower transport of these devices.

Figure 10:
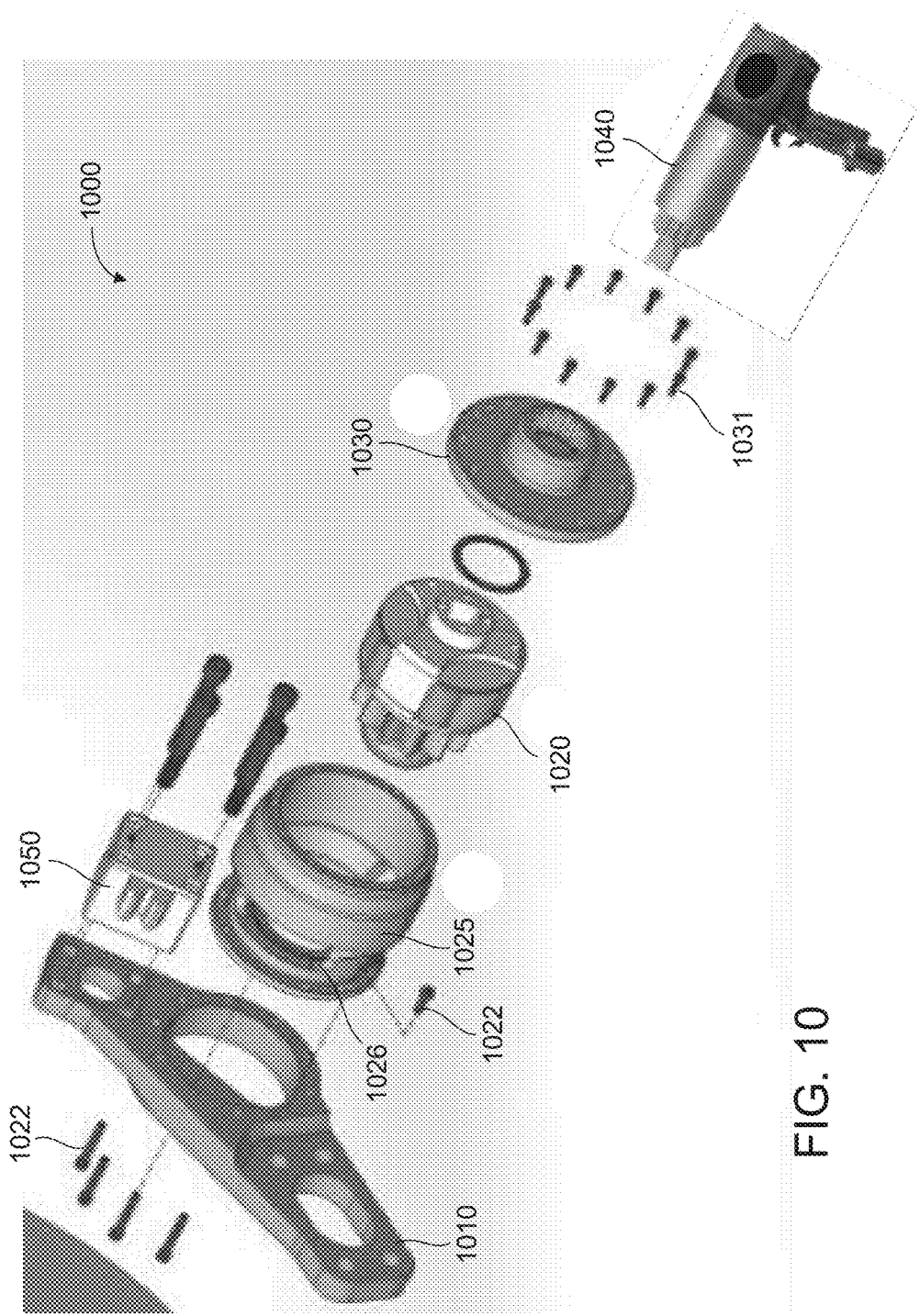
FIG. 10 illustrates an exploded view of a rotor turning system, according to an aspect of the present invention.

FIG. 10 illustrates an exploded view of a rotor turning system 1000, according to an aspect of the present invention. The rotor turning system 1000 includes a fixture plate 1010 configured for attachment to a gearbox 130, a housing 1025 configured for attachment to the fixture plate 1010, a locking mechanism 1020 configured for attachment to the housing 1025, a reaction fixture 1030 configured for attachment to the locking mechanism 1020 and a torque applying device 1040 configured for operation with the locking mechanism 1020 and the reaction fixture 1030. A lockout assembly 1050 is configured for attachment to the fixture plate 1010. The lockout assembly 1050 is also configured to engage a toothed peripheral surface of brake disk 302. The rotor turning system 1000 is configured to permit rotation of the rotor 108 only when the torque applying device 1040 is activated, and in only one rotational direction. In other words, torque produced by gravity and/or wind acting on the one or more blades 112 will not cause the rotor 108 to turn.

Figure 11:
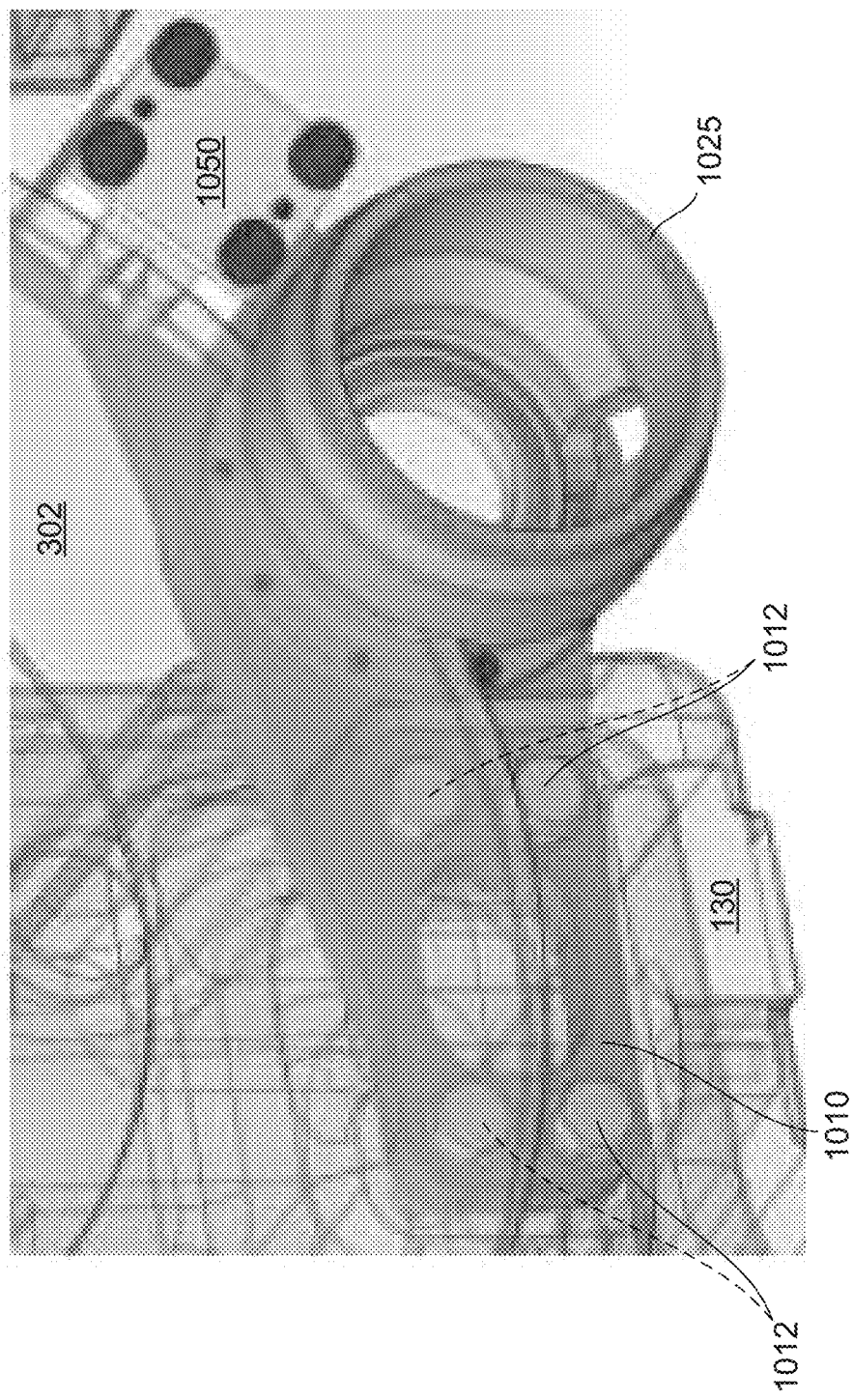
FIG. 11 illustrates a perspective view of the rotor turning system attached to the gearbox, according to an aspect of the present invention.

FIG. 11 illustrates a perspective view of the rotor turning system 1000 attached to the gearbox 130, according to an aspect of the present invention. The housing 1025 may be attached to the fixture plate 1010 first by the use of fasteners 1022 (e.g., bolts or screws). The fixture plate 1010 may then be attached to gearbox 130 by the use of fasteners 1012 (e.g., bolts or screws). The housing 1025 includes a window 1026 that can be placed over the brake disk 302, as well as a pinion bearing (not shown). The housing 1025 weighs less than about 40 pounds. The weight limit of less than about 40 pounds is designed to facilitate up-tower transport of the housing 1025.

Figure 13:
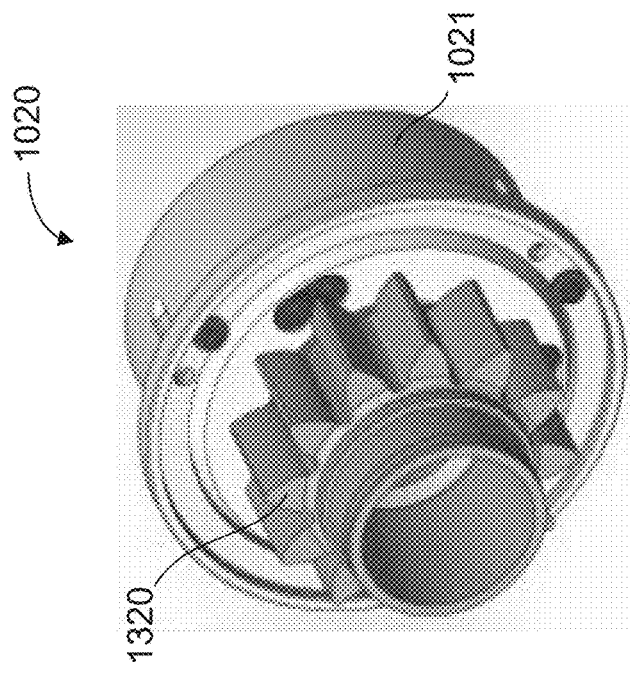
FIGS. 12 and 13 illustrate perspective views of the locking mechanism and its temporary housing, according to an aspect of the present invention.
Figure 12:
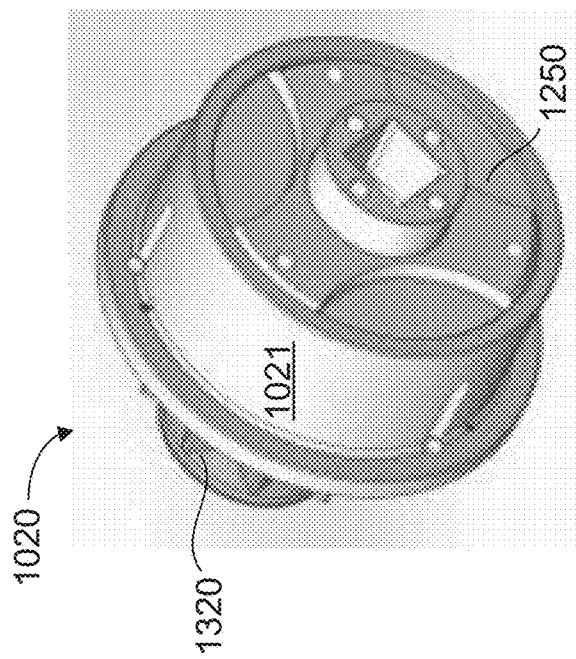

FIGS. 12 and 13 illustrate perspective views of the locking mechanism 1020 and its temporary housing 1021, according to an aspect of the present invention. The locking mechanism 1020 includes a drive paw 1250 connected to a pinion gear 1320. The temporary housing 1021 protects the locking mechanism during transportation.

Figure 14:
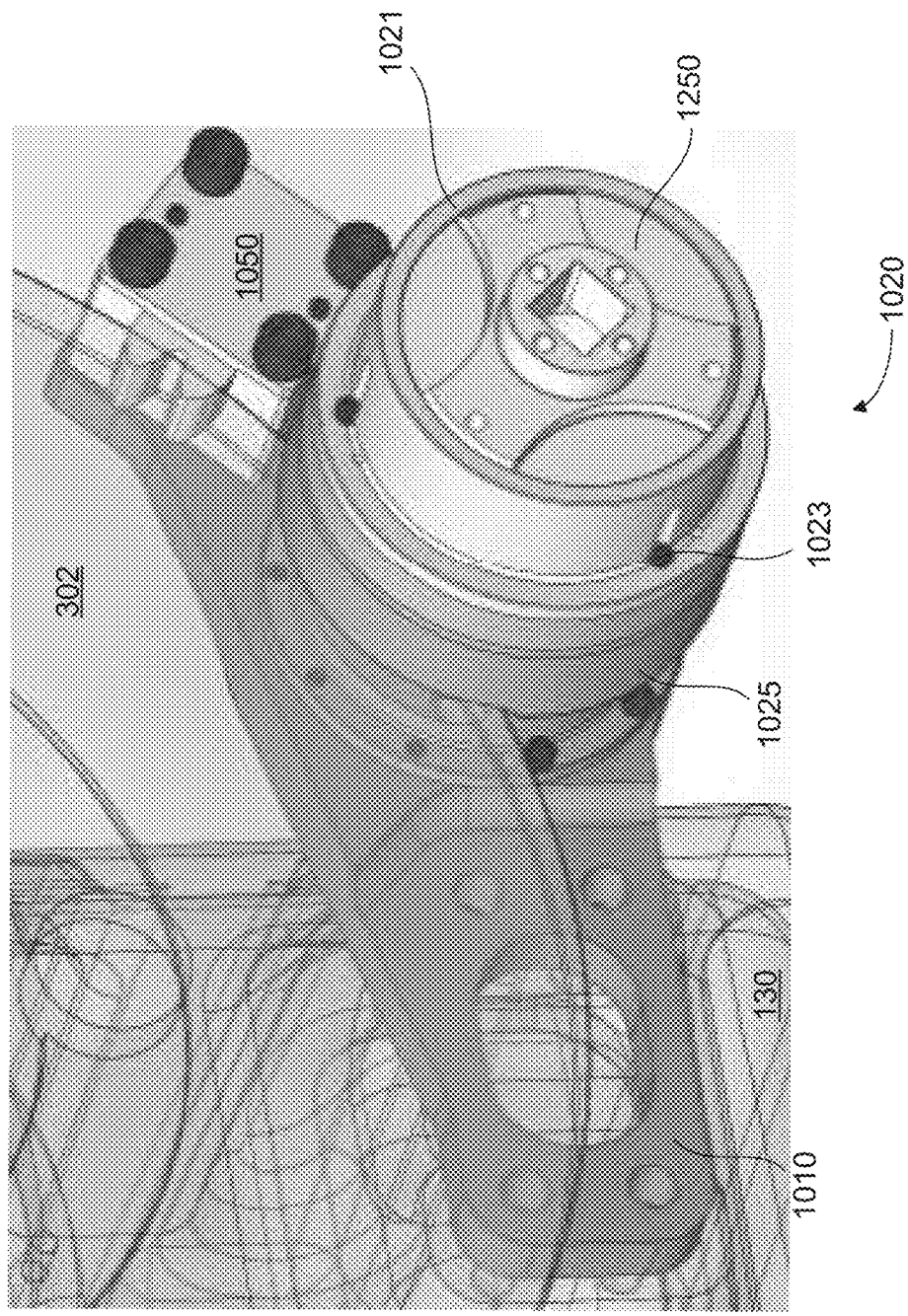
FIG. 14 illustrates a perspective view of the rotor turning system attached to the gearbox, according to an aspect of the present invention.
Figure 15:
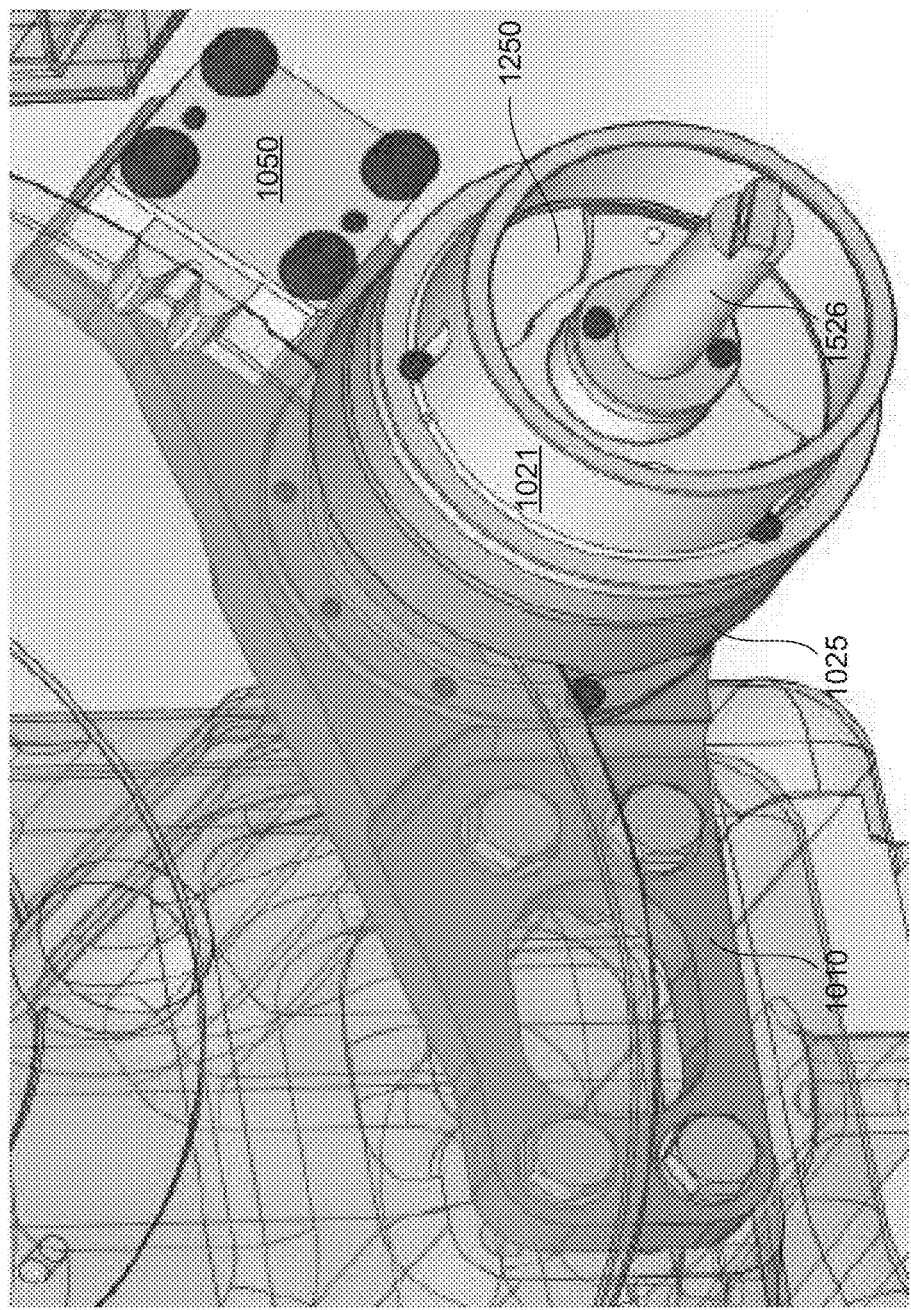
FIG. 15 illustrates a perspective view of the locking mechanism being inserted into the housing, according to an aspect of the present invention.

FIG. 14 illustrates a perspective view of the rotor turning system 1000 attached to the gearbox 130, according to an aspect of the present invention. The temporary housing 1021 is attached to the housing 1025 by fasteners 1023. This arrangement supports the locking mechanism 1020 during installation. FIG. 15 illustrates a perspective view of the locking mechanism 1020 being inserted into the housing 1025. A temporary handle 1526 may be attached to the drive paw 1250 to facilitate the insertion of the locking mechanism 1020 into the housing 1025. The drive pinion 1320 teeth will engage (or slip between) the teeth on the brake disk. After the locking mechanism is inserted fully into the housing 1025, the temporary housing 1021 and the handle 1526 can be removed.

Figure 16:
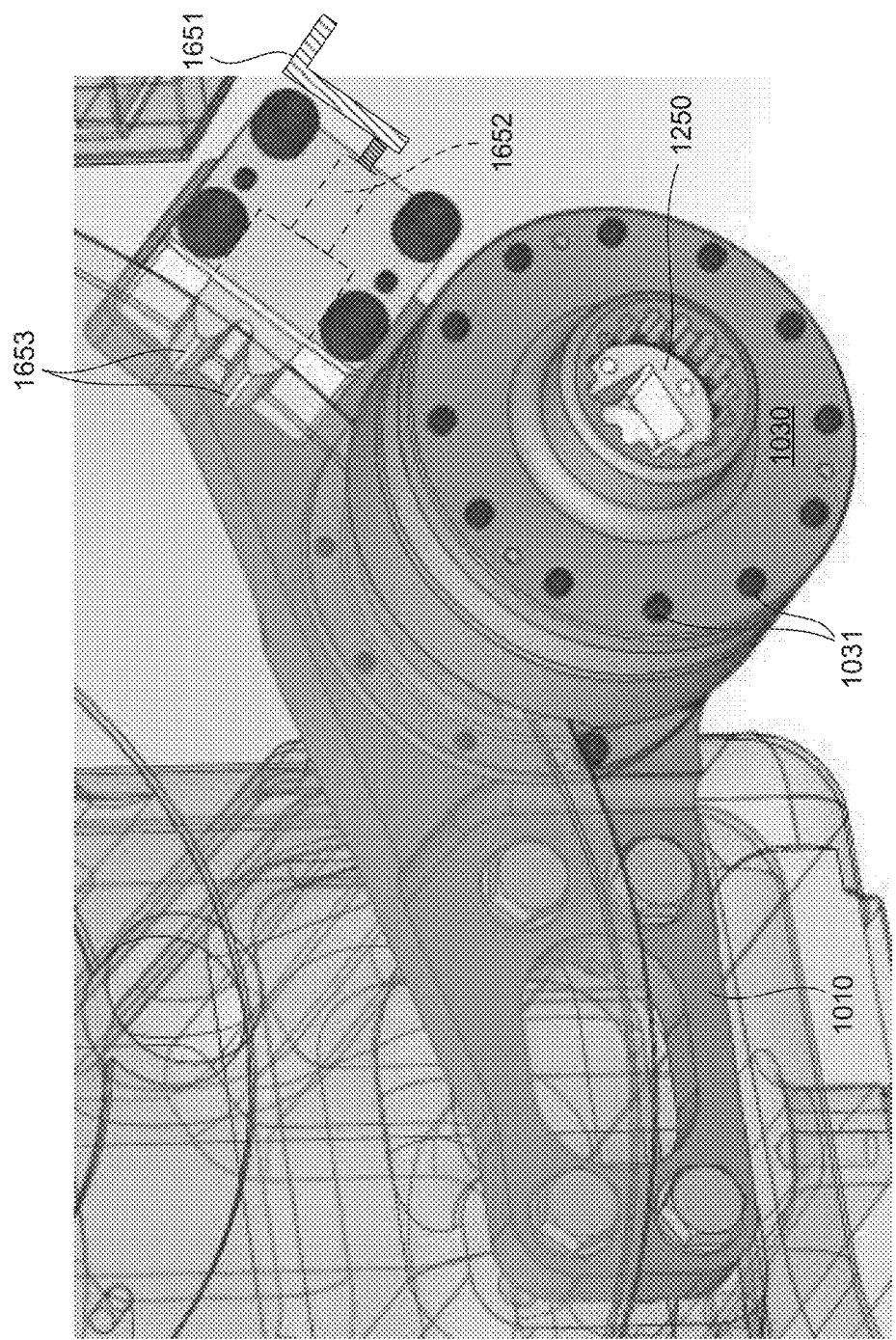
FIG. 16 illustrates a perspective view of the rotor turning system attached to the gearbox, according to an aspect of the present invention.

FIG. 16 illustrates a perspective view of the rotor turning system 1000 attached to the gearbox 130, according to an aspect of the present invention. After the temporary housing 1021 is removed, the reaction fixture can be attached to the housing 1025 by a plurality of fasteners 1031. The system 1000 is now ready for a rotor turning operation, and the torque applying device 1040 may be inserted into the reaction fixture 1030 and drive paw 1250. The locking mechanism 1050 may include a handle 1651 connected to a grub screw (or threaded shaft) 1652. The shaft 1652 imparts radial motion to the teeth 1653 of the lockout assembly 1050. Rotation of the handle 1651 can either move the teeth 1653 radially inward (towards the brake disk teeth) or radially outward (away from the brake disk teeth). Once the teeth 1653 engage the brake disk teeth, the rotor is prevented from unwanted rotational movement.

Figure 17:
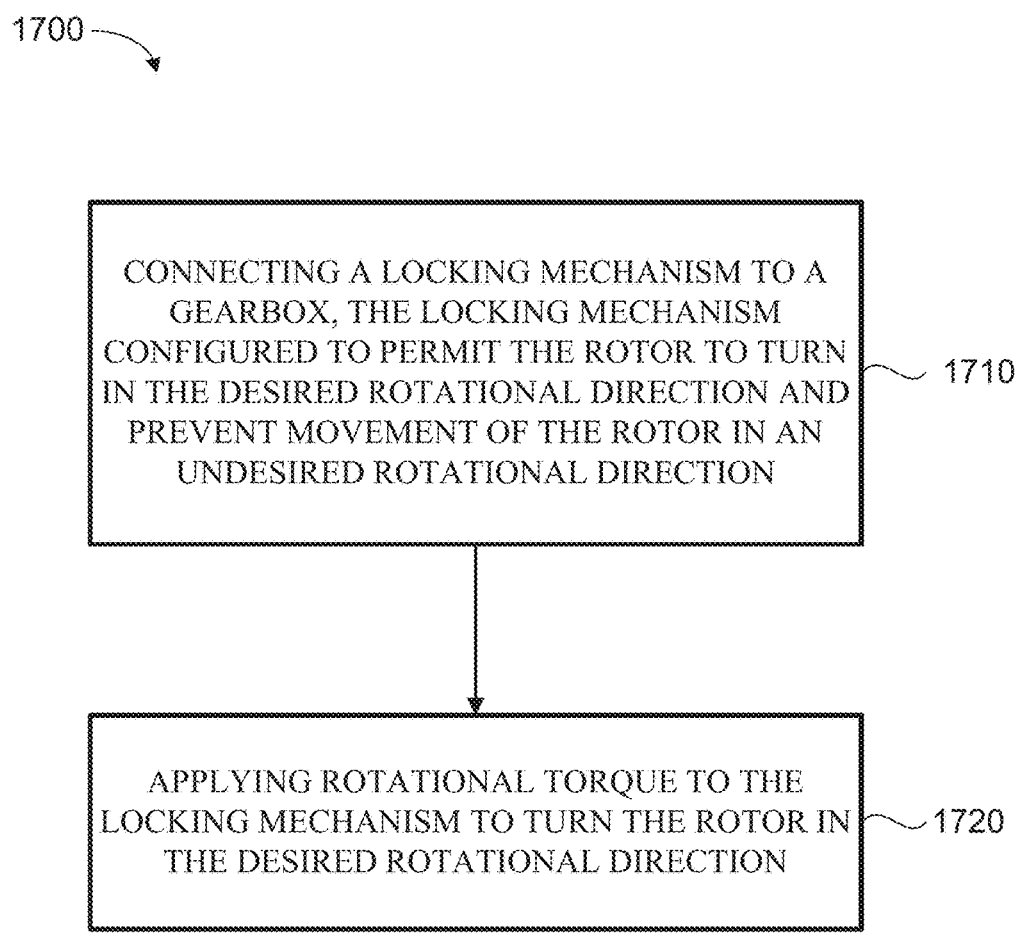
FIG. 17 illustrates a flowchart of a method for turning a rotor, according to an aspect of the present invention.

FIG. 17 illustrates a flowchart of a method 1700 for turning a rotor 108, according to an aspect of the present invention. The method 1700 for turning a rotor 108 in a desired rotational direction (e.g., clockwise) includes a step 1710 of connecting a locking mechanism 1020, 1025 to a gearbox 130 and applying rotational torque to the locking mechanism 1020 to turn the rotor 108 in the desired rotational direction (e.g., clockwise). An applying step 1720 applies rotational torque to the locking mechanism 1020 to turn the rotor in the desired rotational direction. The locking mechanism 1020 is configured to permit the rotor 108 to turn in the desired rotational direction (e.g., clockwise) and prevent movement of the rotor 108 in an undesired rotational direction (e.g., counter-clockwise). When the rotational torque is removed the locking mechanism 1020 is configured to prevent movement of the rotor 108 in the undesired rotational direction (e.g., counter-clockwise). The desired rotational direction is opposite to the undesired rotational direction (e.g., clockwise vs. counter-clockwise, or vice-versa). The connecting step 1710 may also include engaging teeth of a drive pinion 1320 in the locking mechanism with teeth of a brake disk 302 connected to the gearbox 130. The locking mechanism includes a drive paw 1250 having curved surfaces configured to contact a plurality of bearings. The locking mechanism 1020 is configured to permit the rotor to turn in the desired rotational direction by the curved surfaces pushing a portion of the plurality of bearings down ramped surfaces of a hub when rotational torque is applied by a torque applying device. The locking mechanism prevents movement of the rotor in the undesired rotational direction by a second portion of the plurality of bearings being forced up the ramped surfaces and lodging between the basket and the ramped surfaces when no rotational torque is applied by the torque applying device.

The system and method of the present invention demonstrates substantially improved results that were unexpected, because an unbalanced rotor can now be rotated without the fear of unwanted rotational movement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turning system for a rotor, the system comprising:
a fixture plate configured for attachment to a gearbox;
a locking mechanism configured for attachment to the fixture plate;
a reaction fixture configured for attachment to the locking mechanism;
wherein, the turning system is configured to permit rotation of the rotor only when rotational torque is applied to the locking mechanism, and this rotation is in only one rotational direction, and
wherein the locking mechanism comprises a pinion gear configured for interaction with a brake disk mechanically coupled with the rotor.

2. The system of claim 1, further comprising:
a torque applying device configured for applying rotational torque to the locking mechanism, the torque applying device configured for operation with the reaction fixture; and
a lockout assembly configured for attachment to the fixture plate.

3. The system of claim 1, the fixture plate further comprising:
a substantially circular opening; and
wherein the locking mechanism attaches to the fixture plate around the substantially circular opening.

4. The system of claim 3, wherein the locking mechanism further comprises:
a substantially circular shoulder configured to fit into the substantially circular opening of the fixture plate; and
wherein the substantially circular opening and the substantially circular shoulder function to support a portion of a weight of the locking mechanism to facilitate attachment of the locking mechanism to the fixture plate.

5. The system of claim 1, wherein the locking mechanism further comprises:
a hub rigidly connected to the pinion gear;
a plurality of bearings dispersed about the hub;
a drive paw having a plurality of fingers, each of the fingers extending over the hub and each of the fingers located between two of the bearings, the drive paw is configured for interaction with the torque applying device;
a basket circumferentially disposed over the hub and the drive paw, and
wherein, the locking mechanism is configured to prevent rotation of the brake disk without rotational torque supplied by a torque applying device to the drive paw.

6. The system of claim 5, wherein the locking mechanism further comprises:
a plurality of spring members located in the hub, each of the spring members biasing one of the bearings toward a finger of the drive paw.

7. The system of claim 6, wherein the drive paw further comprises:
curved surfaces configured to contact the plurality of bearings; and
wherein the curved surfaces are configured to push a portion of the plurality of bearings down a ramped surfaces of the hub when torque is applied by the torque applying device, thereby resulting in rotation of the hub and pinion gear.

8. The system of claim 7, wherein the ramped surfaces of the hub are configured to contact the plurality of bearings; and
wherein the ramped surfaces permit the drive paw to push a first portion of the plurality of bearings away from the basket, and a second portion of the plurality of bearings are allowed to rotate between the basket and the hub.

9. The system of claim 8, wherein the system is configured to stop rotation of the hub, the pinion gear and the rotor when no torque is applied by the torque applying device, by the second portion of the plurality of bearings being forced up the ramped surfaces and lodging between the basket and the ramped surfaces.

10. The system of claim 1, wherein the reaction fixture further comprises:
a toothed inner surface configured to interact with a toothed outer surface of the torque applying device, both the toothed inner surface and the toothed outer surface are configured to prevent an outer body of the torque applying device from rotating during activation of the torque applying device.

11. The system of claim 1, further comprising:
a housing configured for attachment to the fixture plate, the housing configured for containing the locking mechanism.

12. The system of claim 11, further comprising:
a temporary housing configured for attachment to the locking mechanism, and wherein the temporary housing is configured to be removed from the locking mechanism after the locking mechanism is inserted into the housing.

13. A rotor turning system comprising:
a fixture plate configured for attachment to a gearbox, the fixture plate also configured for attachment to a lockout assembly;
a locking mechanism configured for attachment to the fixture plate, the locking mechanism also configured for operation with a torque applying device, the torque applying device configured for applying rotational torque to the locking mechanism;
a reaction fixture configured for attachment to the locking mechanism, the reaction fixture configured as a support against rotational movement for the torque applying device; and
wherein the locking mechanism is configured to permit rotation of the rotor in a desired rotational direction when rotational torque is applied to the locking mechanism by the torque applying device, and the locking mechanism is configured to prevent rotation of the rotor in an undesired rotational direction when rotational torque is not applied to the locking mechanism by the torque applying device, and
wherein the locking mechanism comprises a pinion gear configured for interaction with a brake disk mechanically coupled with the rotor.

14. The system of claim 13, the locking mechanism further comprising:
a housing configured for attachment to the fixture plate, the housing configured for containing the locking mechanism; and
a temporary housing configured for attachment to the locking mechanism, and wherein the temporary housing is configured to be removed from the locking mechanism after the locking mechanism is inserted into the housing.

15. The system of claim 14, wherein the locking mechanism further comprises:
a hub rigidly connected to the pinion gear;
a plurality of bearings dispersed about the hub;
a drive paw having a plurality of fingers, each of the fingers extending over the hub and each of the fingers located between two of the bearings, the drive paw is configured for interaction with the torque applying device, the drive paw having curved surfaces configured to contact the plurality of bearings; wherein the curved surfaces are configured to push a portion of the plurality of bearings down ramped surfaces of the hub when torque is applied by the torque applying device;
a plurality of spring members located in the hub, each of the spring members biasing one of the plurality of bearings toward a finger of the drive paw; and
a basket circumferentially disposed over the hub and the drive paw.

16. The system of claim 15, wherein the ramped surfaces of the hub are configured to allow the drive paw to push a first portion of the plurality of bearings away from the basket, and a second portion of the plurality of bearings are allowed to rotate between the basket and the hub when torque is applied by the torque applying device thereby allowing rotation of the rotor; and
when no torque is applied by the torque applying device, the second portion of the plurality of bearings are forced up the ramped surfaces and lodge between the basket and the ramped surfaces, thereby preventing rotation of the rotor.

17. A method for turning a rotor in a desired rotational direction, the method comprising the steps of:
connecting a locking mechanism to a gearbox, the locking mechanism configured to permit the rotor to turn in the desired rotational direction and prevent movement of the rotor in an undesired rotational direction;
applying rotational torque to the locking mechanism to turn the rotor in the desired rotational direction; and
wherein, when the rotational torque is removed the locking mechanism is configured to prevent movement of the rotor in the undesired rotational direction, and
wherein the connecting step comprises engaging teeth of a drive pinion in the locking mechanism with teeth of a brake disk connected to the rotor.

18. The method of claim 17, wherein the desired rotational direction is opposite to the undesired rotational direction.

19. The method of claim 17, wherein the locking mechanism further comprises a drive paw having curved surfaces configured to contact a plurality of bearings, wherein the locking mechanism is configured to:
permit the rotor to turn in the desired rotational direction by the curved surfaces pushing a portion of the plurality of bearings down ramped surfaces of a hub when rotational torque is applied by a torque applying device; and
prevent movement of the rotor in the undesired rotational direction by a second portion of the plurality of bearings being forced up the ramped surfaces and lodging between the basket and the ramped surfaces when no rotational torque is applied by the torque applying device.

* * * * *